United States Patent [19]

Chevalier et al.

[11] 4,377,226

[45] Mar. 22, 1983

[54] DEVICE CONTROLLING THE BRIDGING OF A HYDRODYNAMIC TORQUE CONVERTER

[75] Inventors: Claude Chevalier, Jouars-Pontchartrain; Jean-Marie Bouvet, Boulogne-Billancourt; Jean P. Parthuisot, Rueil-Malmaison, all of France

[73] Assignee: Regie Nationale des Usines Renault, Boulogne-Billancourt, France

[21] Appl. No.: 158,549

[22] Filed: Jun. 11, 1980

[30] Foreign Application Priority Data

Jun. 13, 1979 [FR] France ................................ 79 15191
Mar. 19, 1980 [FR] France ................................ 80 06167

[51] Int. Cl.³ ............................................. F16D 33/00
[52] U.S. Cl. .................................... 192/3.3; 192/3.31
[58] Field of Search ................... 192/3.31, 3.3, 3.29, 192/3.28, 0.033; 60/357, 337; 137/115, 513.3

[56] References Cited

U.S. PATENT DOCUMENTS

| 2,824,631 | 2/1958 | De Lorean | 192/3.3 |
| 2,965,202 | 12/1960 | Christenson | 192/3.3 |
| 3,241,399 | 3/1966 | Fisher et al. | 192/3.3 |
| 3,693,478 | 9/1972 | Malloy | 192/3.3 |
| 3,734,251 | 5/1973 | Annis | 192/3.3 |
| 4,167,993 | 9/1979 | Vukovich et al. | 192/3.3 |

FOREIGN PATENT DOCUMENTS 2120619 11/1972 Fed. Rep. of Germany ....... 192/3.3

Primary Examiner—George H. Krizmanich
Attorney, Agent, or Firm—Beveridge, DeGrandi & Kline

[57] ABSTRACT

The control device comprises a moving slide 25 acted on by a return spring 27 and capable of uncovering an orifice 31 allowing hydraulic fluid to be fed to a release chamber 32 moving the control piston 17 removing the "bridging" between the input impeller 2 and the output turbine 10 of the converter 1. The "bridging" is actuated by an electrohydraulic transducer 43 controlled by an electronic device 49 in accordance with the input and output speeds sensed by sensors 46 and 48.

"Bridging" of the converter 1 is thus achieved for all the transmission ratios as well as "debridging" on each change from one ratio to another.

24 Claims, 4 Drawing Figures

DEVICE CONTROLLING THE BRIDGING OF A HYDRODYNAMIC TORQUE CONVERTER

The present invention concerns a "bridging" control device providing for slipless coupling between the input shaft and the output shaft of a hydrodynamic torque converter and specifically of such a converter used in an automatic transmission with several transmission ratios changed under torque for an automotive vehicle.

The automatic transmissions used in such automotive vehicles comprise a hydrokinetic torque converter placed between the vehicle drive engine and the gearbox. The torque converter multiplies the input torque supplied by the drive engine by a certain factor during a transient phase known as the torque conversion phase. Above a certain value of the rotational speed of the converter output shaft the torque conversion phase is completed and a coupling phase is reached during which, however, there still remains some slippage between the rotating converter input and output components which reduces the overall efficiency of the power unit and thus increases its fuel consumption. Thus, in order to cut down on this consumption in the case of a vehicle fitted with this type of automatic transmission with torque converter, locking the input and output components has been contemplated, as soon as as the conversion phase it terminated, so as to eliminate slippage. This operation is known as "bridging" between the output shaft and the input shaft of the torque converter.

Certain known torque converter "bridging" control devices form an integral part of the transmission's power hydraulics system. The control components fitted above the converter produce, whatever the state of the control device and whatever the working regime of the converter, a constant supply or forced feed of hydraulic fluid to the converter casing. The result is a big hydraulic fluid flow which leads to pressure losses and a drop in efficiency that do not allow all the expected energy savings to be achieved.

Furthermore, in control devices of this type integrated with the general transmission hydraulic feed, the various adjustments to the "bridging" control system are hard to perform and risk causing corresponding changes in the general functioning of the transmission.

The object of the present invention is a "bridging" control device which enables a maximum reduction in energy consumption and which is designed so that the flow of hydraulic fluid feeding the converter casing suits the flow required for each converter operating phase. In particular, the control device of the invention makes it possible to obtain a high feed flow rate to the converter enclosure or casing during the torque conversion phase, i.e. when, because of the slipping of the various converter members, it is necessary to have ample means for getting rid of heat, whilst in the non-slip "bridging" phase the control device of the invention provides a feed flow to the converter casing which is distinctly lower, since it is virtually no longer necessary to remove heat.

Another object of the invention is a "bridging" control device which is independent of the general transmission feed hydraulic system and which can therefore easily be adjusted and set separately from the overall hydraulic supply system.

Furthermore, another object of the invention is a "bridging" control device the construction of which allows for a cavity incorporated within the actual converter so as to reduce the latter's bulk whilst still achieving the various desired control functions in a simple manner.

Finally, as opposed to the various "bridging" control systems of known type, an object of the invention is a control device which receives data on the operation of the transmission and of the vehicle fitted with the said transmission after processing by an electronic device in such a way as permit "bridging" on each of the transmission ratios whilst preventing "bridging" taking place at the time the various ratios are changed and taking into consideration the actual operation of the converter.

The "bridging" control device of the invention permits slipless coupling between the input shaft and the output shaft of a hydrodynamic torque converter comprising a clutch fitted with a control piston. According to the invention the control unit comprises a hydraulic valve placed in the circuit feeding the converter casing with hydraulic fluid and actuated by the pressure obtaining in the said casing so as to selectively feed either the converter casing or enclosure, or a control piston release chamber.

In a preferred embodiment the control piston (engagement piston) is locked in rotation with the input shaft and is installed inside the converter casing forming a moving wall for the clutch disengagement or release chamber. A clamping or gripping portion of the control piston acts as a clutch enabling the input shaft and the output shaft to be locked together, preferably via a torsional vibration damping device. To this end the clamping portion is preferably lined with friction material which also acts as a seal for the release chamber.

In a first variant, the hydraulic valve comprises a moving component acted on by a return spring and by the pressure difference between the constant pressure hydraulic fluid feed and the converter casing. When the moving component is moved, feed hydraulic fluid flows to the control piston release chamber and frees a calibrated orifice which was previously blocked off by the moving component.

The hydraulic valve also comprises systems permitting feed hydraulic fluid to flow to the converter casing in all positions of the moving component. In a preferred embodiment these systems permitting through flow of hydraulic fluid to the converter casing are formed by a restrictor installed in the moving component itself. Thus, when the calibrated orifice communicating with the control piston release chamber is blocked off by the moving component, the whole of the feed hydraulic fluid flow enters the converter via the hydraulic valve restrictor. This leads to a low pressure in the converter casing. The static equilibrium of the moving component is such that it blocks off the orifice leading through to the release chamber, with the control piston performing the "bridging" operation by means of the portion of it which acts as a clutch. The converter is then in the "bridging" phase. When the pressure level in the converter casing drops to a low level, the moving component moves, freeing the calibrated orifice joining the feed hydraulic fluid to the release chamber. The control piston moves, thus unlocking the input shaft from the output shaft of the converter, which is then in the conversion phase. There is a considerable flow of hydraulic fluid into the converter casing which enables the heat arising due to the slipping of the various converter members over each other to be removed.

In a second variant the hydraulic valve comprises a moving component acted on by a return spring and the pressure difference between the hydraulic fluid feed, which is provided at constant pressure and the release chamber. Movement by the moving component allows the feed hydraulic fluid to flow to the converter casing through a flow duct. The hydraulic valve also comprises a restrictor allowing feed hydraulic fluid to flow to the release chamber whatever the position of the moving component.

The moving component is preferably formed by a slide moving inside a cavity or housing and capable of covering or uncovering the flow duct to the converter casing. The upstream face of the slide is acted on by the constant pressure of the hydraulic feed fluid whilst the downstream face is acted on both by the pressure obtaining in the release chamber and by the return compression spring.

In all cases the hydraulic valve is preferably housed inside the converter hub end, with the constant pressure hydraulic fluid feed passing through a central transmission shaft. Owing to this special position of the control device of the invention, pressure losses are considerably reduced, particularly in the case of an "axle gearbox unit" transmission configuration.

The control device of the invention also comprises an electrohydraulic transducer which may exist, for example, in the form of an electrovalve (solenoid-operated valve) installed in the hydraulic circuit downstream of the converter.

In a variant, a restrictor is mounted in parallel with the said transducer. Selective opening of the electrovalve leads to a pressure drop in the converter casing which cases the moving component of the hydraulic valve to move and actuate the "bridging" operation. In order to get completely safe operation, the electrohydraulic transducer is mounted in such a manner that if there is no control signal, notably in the case of failure, it goes over to the position in which the electrovalve is open; the converter is then in the torque conversion phase.

In another variant, the electrohydraulic transducer is formed by a three-way two-position electrovalve installed in such a manner as to close the converter casing circuit in a first position and to close the release chamber circuit in a second position. It is advantageous to install a restrictor in the circuit between the converter casing and the electrovalve. Thus, when the electrovalve occupies the second position in which the release chamber circuit is closed, the pressure which is set up in the converter circuit between the first restrictor of the hydraulic control valve and this second restrictor is an intermediate pressure lower than the hydraulic fluid feed pressure which also obtains in the release chamber.

In another embodiment version, the electrohydraulic transducer is formed by a simple blocking check valve, with a second restrictor being installed in a secondary fluid reservoir return duct. In this variant the converter casing does not have an outlet orifice and it is the release chamber which is connected to the hydraulic fluid reservoir through the electrovalve blocking check valve and the second restrictor.

In a preferred application, the "bridging" control device of the invention comprises a combined electronic device receiving signals corresponding respectively to the rotational speed of the input shaft and of the output shaft of the converter so that the electrohydraulic transducer is operated as soon as the ratio between these speeds reaches a pre-set value corresponding to the converter's theoretical coupling point.

The electronic device preferably comprises a time delay circuit receiving transmission gear change signals so that "bridging" is interrupted on each gear change by corresponding action on the electrohydraulic transducer.

The invention will be more clearly understood after study of the detailed description of an embodiment taken simply as an example that is in no manner exclusive, and illustrated by the appended drawings, in which.

Figures 1, 2:
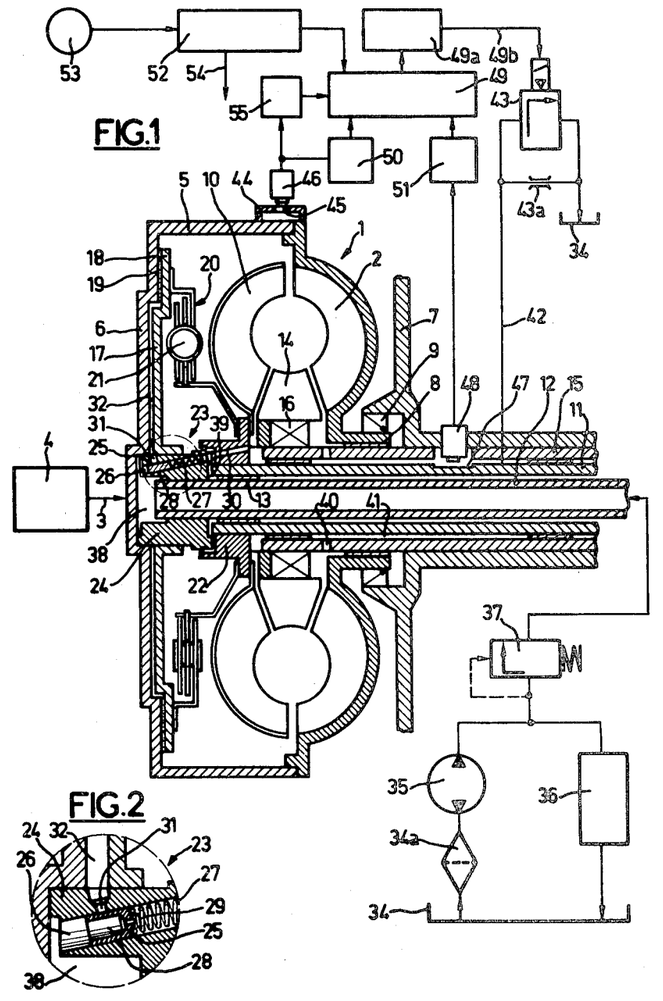
FIG. 1 is a schematic longitudinal section view of an embodiment of a hydrodynamic torque converter which also shows the main components of the electronic control device in the form of functional blocks.
FIG. 2 is an enlarged detail view showing the particular construction of the hydraulic valve in FIG. 1.

As shown in FIG. 1, the converter (1) comprises an input member (2) also called the pump or impeller, connected mechanically to the input shaft or drive shaft (3) which is fixed to the drive engine (4) through a cylindrical bell (5) with a roughly front-facing end wall (6). The impeller (2) rotates with respect to the frame (7) of the converter (1) by means of a rolling bearing (8) with a seal (9) inserted between.

The output component (10) of the converter (1), i.e. the turbine, is connected to the output shaft (11) which can rotate round a central transmission shaft (12) by means of the rolling bearing (13). The converter (1) is made up by the reactor or stator (14) fitted between the impeller (2) and the turbine (10) and which is installed on a shaft (15) by means of the freewheel device (16) which therefore allows the stator (14) to be locked to the shaft (15) fixed to the casing (7) in one direction of rotation.

A control or actuating piston (17) in the form of a roughly radial plate comprises a friction pad or lining (19) round its peripheral portion (18) which is capable of coming into contact with the corresponding internal front face (6) of the bell (5) so locking the said bell (5) rotationally with the control piston (17). Furthermore, the latter is joined to the turbine (10) through a damping system (20) comprising a number of helical springs (21) so as to damp out torsional vibrations. The damping system (20) fastened directly onto the periphery of the control piston (17) is fixed to the turbine (10) by means of the sleeve (22) which is fixed to the output shaft (11).

It will be noted that the control piston (17) and the damping system (20) are therefore housed inside the actual casing of the converter (1) and lie permanently in a hydraulic fluid bath. So the clutch formed by the lining (19) and the control piston (17) is engaged or released by application of the control piston against the front surface (6) of the converter bell (5) which forms an integral part of the input impeller (10).

A hydraulic valve numbered 23 for the whole unit and seen particularly clearly in FIG. 2 is fitted in the hub (24) of the converter (1) at the end of the central transmission shaft (12) and is fixed to the latter. In the embodiment illustrated, the hydraulic valve (23) comprises a cylindrical slide (25) moving inside a housing (26) running through the hub (24). The slide (25) is acted on by a return compression spring (27) and is advantageously provided with a hollowed out portion (28) on the side of the hydraulic fluid feed constant pressure and on the opposite side from the spring (27) bearing face. A reduced diameter duct (29) made in slide (25) and acting as a restrictor allows hydraulic fluid to flow through the slide (25) towards the converter (1) enclosure through the duct (30) made in the sleeve (22).

An orifice of calibrated diameter (31) is also made in the hub (24) acting as the cylindrical casing for the slide (25) and capable of connecting the through cavity (26) and a release chamber (32) bound by the internal front face (6) of the converter bell (5) and the corresponding opposite face of the control piston (17).

The hydraulic fluid which is intended to both lubricate and feed the converter (1) is pumped into a tank (34) through a strainer (34a) by a pump (35), for example an internal gear pump. The hydraulic fluid thus pumped supplies the hydraulic control device (36) thus providing for the changes between the various ratios of the automatic transmission which is not shown in the figure. The hydraulic fluid also supplies a pressure limiting and control valve (37) which enables a constant value to be maintained for the pressure of the fluid feeding the converter (1). The fluid is sent through a central hole in the transmission shaft (12) into the chamber (38) bounded by the converter hub (24) which connects with the through cavity (26). The constant pressure of the feed fluid therefore exerts a force on the slide (25) which is counterbalanced by a force acting in the opposite direction due to the joint action of the hydraulic fluid pressure obtaining in the converter (1) casing and of the return compression spring (27). Depending on the pressure difference between the chamber (38) and the chamber (39) located at the outlet from the through cavity (26) corresponding approximately to the pressure obtaining in the converter casing as well as on the compression force of the spring (27), the slide (25) may move so as to block off the calibrated orifice (31) as shown in FIGS. 1 and 2 or else, on the contrary, to free this orifice thus allowing the hydraulic fluid to flow into the release chamber (32). The pressure of the hydraulic fluid in the release chamber (32) exerts a force on the surface of the control piston (17) which tends to separate the lining (19) from its bearing surface integral with the bell (5). In the opposite position, when the orifice (31) is blocked, the hydraulic fluid fed through the transmission shaft (12) is sent to chamber 39 and to the converter casing (1) through the restrictor (29) in the slide (25). The hydraulic fluid escapes from the inner enclosure of the converter (1) through the ducts (40) provided in the shaft (15), the annular space (41) remaining between the shaft (15) and the output (11) and the outlet line (42). The hydraulic fluid can then return to the reservoir (34) via the restriction (43a) mounted in parallel with the electrohydraulic transducer (43) which comprises, for example, an electrovalve. This electrovalve, of known construction, may in particular consist of a ball of magnetic material capable of moving between two positions so as to block off the fluid flow or allow it through.

The bell (5) of the input impeller (2) comprises a circular metal ring (44) round its circumference in which equispaced slots (45) are machined. These slots are sensed by a magnetic sensor (46) implemented in a manner known per se. The sensor (46) therefore delivers an electrical signal having a frequency which is proportional to the rotational speed of the input shaft (3) or the engine speed $V_M$. The output shaft (11) which is fixed to the turbine (10) also has equispaced slots (47) round its periphery which can be sensed by a magnetic sensor (48) of the same type as sensor 46. Sensor 48 is therefore also able to deliver an electrical signal the frequency of which is proportional to the rotational speed of the output shaft (11) or turbine speed $V_T$. The signals supplied by sensors 46 and 48 are introduced into an electronic control device (49) via two interface circuits (50 and 51) which, in particular, suitably shape the frequency signals obtained. The electronic device (49) gives out a "bridging" signal transmitted to the electrohydraulic transducer (43) via connection 49b with an output interface circuit (49a) inserted, which comprises in particular the power components needed to drive the transducer (43).

The electronic control device (49) also receives the output signal from an electronic timing circuit (52) connected to a device (53) supplying changeover commands for changing the various transmission ratios and connected to the hydraulic control device (36) by connection 54. Finally, the electronic control device (49) also receives the output signal from a safety circuit (55) connected to sensor 46.

All these electronic control elements, which are described in detail in the French patent application filed by the applicant jointly with the present application and entitled "Dispositif electronique de commande du pontage d'un convertisseur de couple hydrodynamique" (electronic device controlling the "bridging" of a hydrodynamic torque converter), compare the rotational speeds of the input shaft and output shaft of the converter (1) in such a manner as to permit "bridging" as soon as the ratio between these speeds $V_T/V_M$ reaches the value corresponding to the theoretical coupling point of the converter (1), which value in practice lies around 0.8. The electronic processing device (49) delivers a "bridging⇌ signal via connection 49b to the electrohydraulic transducer (43) as soon as this condition is achieved for all the transmission ratios.

Moreover, the electronic timing device (52) makes it possible for "bridging" to be cut out by overriding action on the electronic device (49) for a pre-set time at each change from one transmission ratio to another. As soon as the timing device (52) receives a gear change signal from device 53, it acts through the electronic device (49) to stop the "bridging". In addition, the gear change order is only transmitted by connection 54 after a suitable delay time has elapsed. It is thus possible during the gear changes to put the converter into the conversion phase, thus causing no shock loads to the transmission and the vehicle. Furthermore, the safety circuit (55) makes it possible to prevent any "bridging" from taking place, through the electronic device (49), when the rotational speed of the input shaft (3) is less than a pre-set limit. The electrohydraulic transducer (43) and the signal delivered by the electronic control device (49) are so designed that in the case of failure, for example of the electric power supply, the electrohydraulic transducer (43) always puts itself in the position corresponding to no "bridging", with the torque converter in the conversion phase.

The "bridging" control device of the invention works in the following way:

When the electrohydraulic transducer (43) is controlled by the electronic control device (49) so as to allow the hydraulic fluid to flow from duct 42 to the reservoir (34), it sets up a large fluid flow through the combined ducts formed by the transducer (43) and the restrictor (43a) mounted in parallel. There is a low pressure level in the converter (1) corresponding to this large flow and consequently there is a low pressure level in the chamber (39). The static equilibrium of the slide (25) is such that the differential pressure exerted on this slide moves it and frees the calibrated orifice (31). The feed hydraulic fluid enters the release chamber (32) and disengages the clutch formed by the lining (19) of the device (17). The input impeller (2) and the turbine (10) are thus no longer locked together and the converter (1) is in the conversion phase. It will be noted that in this torque conversion phase, which necessitates the elimination of large amounts of heat, the fluid flow feeding the converter is appropriately large.

When the electrohydraulic transducer (43) is controlled by the electronic control device (49) in such a manner as to no longer allow the hydraulic fluid to flow from the duct (42) to the reservoir (34), the only path which remains for the hydraulic fluid on leaving the converter is the restrictor (43a). The result is a low outflow in the line (42). The pressure in the enclosed converter casing (1) reaches a high level. The static equilibrium of the slide is then such that, due to the pressure difference exerted on this slide, it moves so as to block off the calibrated orifice (31) as shown in FIGS. 1 and 2. The high static pressure obtaining in the converter casing (1), and also the kinetic pressure due to the centrifugal force acting on the fluid inside the converter, act on the control piston (17) so as to exert a clamping force between the lining (19) and the corresponding wall (6) of the bell (5). The input impeller (2) and the output turbine (10) are thus locked together through the damping system (20). Slippage is eliminated between the input component and output component of the converter and the converter is in the "bridging" phase.

It will be noted that in this "bridging" phase, when it is no longer necessary to remove a large amount of heat owing to the lack of slip, the hydraulic fluid flow through the converter is low.

Figure 3:
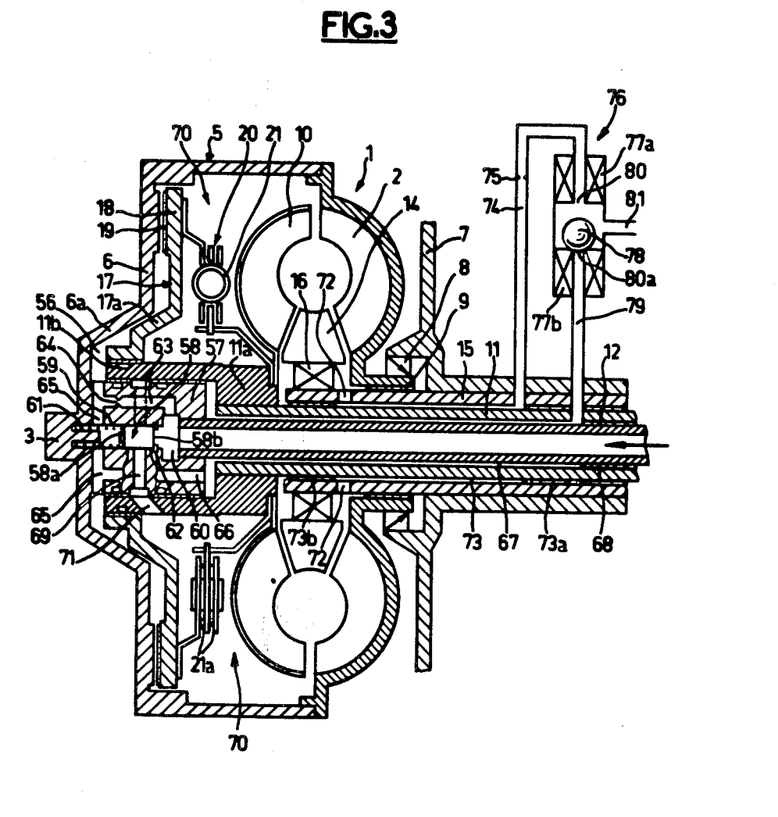
FIG. 3 is a schematic longitudinal section view of a second embodiment of a hydrodynamic torque converter.
Figure 4:
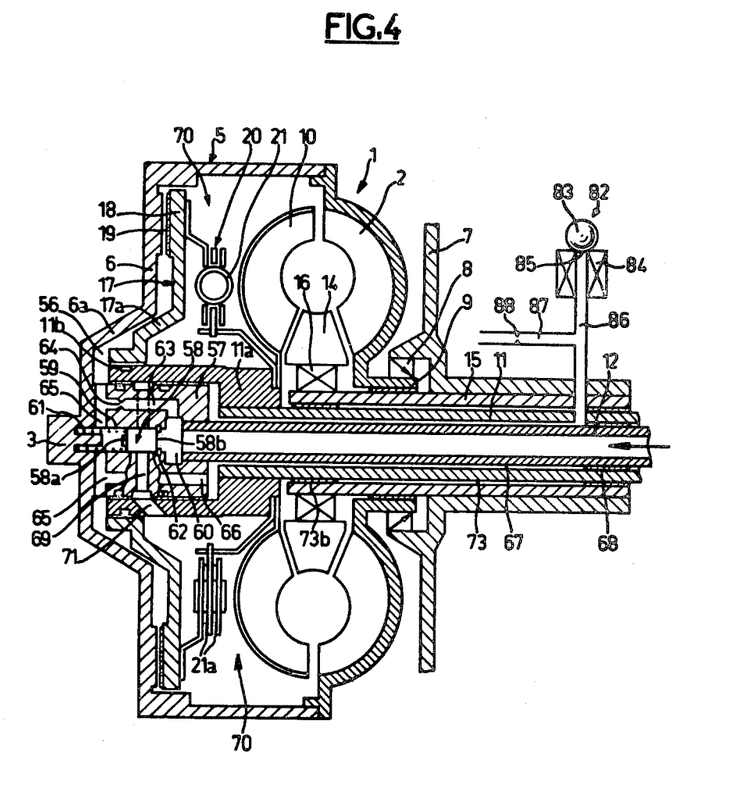
FIG. 4 is a schematic longitudinal section view of a variant of the converter in FIG. 3.

FIGS. 3 and 4, in which similar components are labelled with the same numbers, show two different embodiment versions.

As shown in FIG. 3, the converter (1) comprises an input member (2) also called the pump or impeller, connected mechanically to the input shaft or engine shaft (3) which is fixed to the drive engine not shown in the figure through a cylindrical bell (5) possessing a roughly frontal wall (6) designed with a tapered shoulder (6a). The impeller (2) rotates with respect to the frame (7) of the converter (1) with a seal (8) and a bush (9) inserted between.

The output member (10) of the converter (1) also known as the turbine is connected to an output shaft (11) through the turbine hub (11a). The output shaft (11) can rotate with respect to a central transmission shaft (12). The converter (1) is completed by the reactor or stator (14) inserted between the impeller (2) and the turbine (10) and mounted on a shaft (15) through a freewheel device (16) which thus enables the stator (14) to be locked in one direction of rotation with the shaft (15) fixed to the frame (7).

A control piston (17) constructed in the form of a roughly radial plate designed with a tapered portion (17a), bears on its peripheral portion (18) a friction lining (19) which is able to come into contact with the corresponding internal front face (6) of the bell (5) in such a manner as to lock the said bell (5) and the control piston (17) together. The latter is also fixed to the turbine (10) through a damping system (20) comprising a number of helical springs (21) and friction washers (21a) in such a manner as to damp the torsional vibrations. The damping system (20) is fastened directly to the edge of the control piston (17) and is fixed to the hub (11a) of the turbine (10). The control piston (17) can move axially inside the bell (5) of the converter, leak-tightness being ensured by contact between its bore and a seal (11b) fitted in an annular groove in the turbine hub (11a).

A clutch release chamber (56) is bounded by the front wall (6) and the opposite face of the control piston (17) which forms a movable wall of the release chamber (56).

Inside the hub (57) of the converter which is fixed to the end of the central transmission shaft (12) there is a hydraulic valve installed which consists of a moving cylindrical slide (58) inside a housing (59) which opens out into a distribution chamber (60) which connects to the end of the hollow shaft (12). The slide (58) is acted on by a return compression spring (61), with the axial movement of the slide (58) due to the action of the spring (61) being limited by a stop ring (62).

The hydraulic valve of the hub (57) also comprises a roughly axial duct (63) fitted with a restrictor (64) joining the distribution chamber (60) with the release chamber (56) via a roughly radial duct (65). The duct (65) crosses the housing (59) of the slide (58) and also connects with a roughly axial duct (66) connected to the annular space (67) which subsists between the transmission shaft (12) and the output shaft (11), with leak-tightness of the annular space (67) being ensured by the sealing bush (68).

Furthermore, the hydraulic valve in the hub (57) also comprises roughly radial ducts (69) which are able to connect the converter casing (70), via a duct (71) made in the turbine hub (11a) with the housing (59) and the distribution chamber (60) when the movable slide (58) is moved against the compression force of the spring (61).

The hydraulic fluid leaves the converter enclosure (70) through the outlet orifices (72) connecting with the annular space (73) remaining between the fixed shaft (15) and the output shaft (11) which is sealed by bushes (73a and 73b).

The annular space (73) is connected to a pipe (74) containing a restrictor (75) and ending at one of the ports of a three-way two-position control electrovalve (76) which, in the example illustrated, comprises two electromagnets (77a and 77b) and a check ball (78).

The annular space (67) connected to the release chamber (56) also connects with a pipe (79) ending at the second port (80a) of the electrovalve (76) which is also connected by an outlet pipe (81) to the zero pressure hydraulic reservoir.

It will of course be understood that the electrovalve (76) could be replaced by an equivalent "bridging" control device comprising, for example, a selector spool controlled by an electromagnet.

In the illustrated embodiment, the electrovalve (76) is installed in such a way as to open the pipe (74) outlet port (80) when it receives an electrical signal whilst closing the port (80a) of the other pipe (79).

The converter and its "bridging" or by-passing control device work as follows. The hydraulic fluid is fed to the converter at constant pressure and one-way flow via the hollow transmission shaft (12) and the distribution chamber (60). When the "bridging" control electrovalve (76) is in the state shown in the figure, the check ball (78) blocks off the orifice 80a of pipe 79 and there is no flow set up in the annular space (67). The hydraulic fluid from the distribution chamber (60) flows through duct 63, restrictor 64 and duct 65, thus feeding the release chamber (56). The fluid then passes into the converter enclosure (70) which connects with the release chamber (56) through the space which exists between the frontal face (6) of the bell (5) and the lining (19) of the peripheral edge (18) of the control piston (17). It will be noted that the hydraulic fluid also passes between the edge of the control piston (17) and the internal cylindrical surface of the bell (5) in which a suitable space is provided. The hydraulic fluid returns to the reservoir which is at zero pressure via the outlet orifices (72), the annular space (73), the line (74) and the restrictor (75) through the port (80) of the electrovalve (76) which is then opened by the check ball (78). A pressure $P_1$ determined by the opening cross-sections of these calibrated orifices, and less than the feed pressure P, is set up inside the converter enclosure (70) between the calibrated orifices acting as restrictors (64 and 75) in the hydraulic circuit. This intermediate pressure $P_1$ also obtains in the release chamber (56) and in the housing (59). It therefore acts on the upstream face (58a) of the moving slide (58) and adds to the effect of the compression spring (61). The action of the pressure $P_1$ and of the spring (61) is such that the slide (58) is kept held against the stop ring (62) despite the action of the feed pressure P on the upstream face (58b) of the slide (58) on the distribution chamber (60) side. In this position the slide (58) blocks off the ducts (69) preventing any feed to the converter enclosure (70) through these passages. Therefore the converter enclosure (70) is fed only through the release chamber (56). The control piston (17) is therefore held off the frontal face (6) of the shell (5). The whole unit acts as a torque converter.

When the electrovalve (76) is actuated so that the check ball (78) is placed in the opposite position, blocking port 80 and freeing port 80a, the hydraulic fluid from the release chamber (56) can return to the hydraulic fluid reservoir through ducts 65 and 66 in the hub (57), the annular space (67) and the line (79) connected to the electrovalve (76) and opened up by the ball (78). So the pressure in the release chamber (56) drops. The moving slide (58) is now only subjected on its downstream face to the action of the compression spring (61). The feed pressure, which is still equal to the pressure P because of the existence of the calibrated orifice (64) which limits the outflow, therefore has an overriding effect on the upstream face (58b) of the moving slide (58) on the distribution chamber (60) side. The moving slide (58) is therefore pushed against the frontal face (6) of the shell (5) compressing the spring (61) and freeing the orifices of ducts 69. The converter enclosure (70) is then fed through ducts 69 and 71. Since the release chamber (56) is at zero pressure, the feed pressure P obtaining in the enclosure (70) acts on the control piston (17) which moves until the lining (19) comes into friction contact with the front face (6) of the shell (5). This achieves a clutch effect owing to the existence of this lining (19) which is also preferably implemented in such a manner as to provide a seal at the same time by contact. The hydraulic fluid pressure obtaining in the converter enclosure (70) is such that the force transmitted to the control piston (17) is capable of ensuring the torque transmission to the output shaft (11) through the piston (17) and the torsional vibration damping system (20). Slip between the impeller (2) and the turbine (10) is eliminated. The converter is "bridged" or by-passed. It will be noted that in this configuration the flow of hydraulic fluid returning to the reservoir is limited by the calibrated orifice (64). This fluid return passes through ducts 65, the slide structure (58) and its housing (59) being so constructed that the connection is kept open between duct 63 fitted with the restrictor (64) and duct 66 through ducts 65.

It can be seen that actuation of "bridging" can be easily performed by means of the moving slide (58) and the restrictor (64). The slide (58) opens or closes the feed circuit formed by ducts 69 connecting with the converter enclosure (70). Moreover, the restrictor (64), in the "bridging" phase, enables the hydraulic fluid pressure to be set up in the enclosure (70) and a lower pressure to be obtained in the release chamber (56) than the pressure obtaining in the converter enclosure (70), thus permitting direct non-slip torque transmission.

The embodiment illustrated in FIG. 4, in which the same parts bear the same reference numbers, only differs from the embodiment in FIG. 3 by the fact that the converter enclosure (70) is here closed by construction; the hydraulic fluid is returned to the reservoir via the release chamber (56).

Furthermore, in this embodiment, the electrovalve (82) is formed by a simple ball blocking valve consisting of a ball (83) and an electromagnet (84). The ball (83) is able to block off an outlet orifice (85) from a line (86) connected to the annular space (67) connecting through ducts 66 and 65 with the release chamber (56) as was previously seen for the embodiment in FIG. 1. A secondary return line (87) is also connected to line 86 and includes a restrictor (88) which is thus installed in parallel with the electrovalve (82). The secondary return line (87) is connected to the zero pressure hydraulic fluid reservoir.

This embodiment functions as follows. The converter is fed with hydraulic fluid as before at constant pressure and with flow in one direction through the transmission shaft (12) and the distribution chamber (60). When the "bridging" control electrovalve (82) is in the state shown in FIG. 2 (4?), with the ball (83) blocking the outlet (85) from the line (86), the hydraulic fluid returns to the reservoir through the secondary return line (87) and the restrictor (88) only. The hydraulic fluid from the distribution chamber (60) flows through duct 63 and restrictor 64 before entering the release chamber (56) via ducts 65. The hydraulic fluid returns to the reservoir through duct 65 crossing the valve housing (59) and then through duct 66 and the annular space (67) connected, as has just been stated, to the line (86) and the secondary outlet duct (87). A pressure $P_1$ is set up between the calibrated orifices 64 and 88 acting as restrictors, which pressure is determined by the flow cross-sections of these calibrated orifices and is less than the feed pressure P. As previously this intermediate pressure P obtaining in the housing (59) is added to the action of the compression spring (61) and holds the slide (58) against the stop ring (62). So the slide (58) blocks off the ducts (69) thus preventing any direct feed to the converter enclosure (70). So the converter enclosure (70) is only fed via ducts 65 and the release chamber (56). The control piston (17) is held off the frontal face (6) of the bell (5) of the converter which therefore acts as a torque converter.

When the electrovalve (82) is in the opposite position, with the ball (83) opening the line (86) orifice (85), the hydraulic fluid returns to the reservoir both through the line (86) and through the secondary return duct (87) which means that the hydraulic fluid flow cross-section is larger. The pressure drops in the release chamber (56) and in the housing (59) which are both connected to the line (86) via the annular space (67) and the ducts (66). The slide (58), which on its downstream face (58a) is no longer acted on by the compression spring (61) moves under the action of the feed pressure P obtaining in the distribution chamber (60) and frees the ports of ducts 69. The feed pressure, which is also equal to P owing to the presence of the calibrated orifice (64) acting as a restrictor limiting the outflow rate, thus has an overriding action on the slide (58). The converter casing (70) is fed at pressure P. Because the release chamber (56) is at roughly zero pressure, the control piston (17) is moved until the lining (19) comes into friction contact with the frontal face (6), thus acting as a clutch, as in the previous embodiment, and so performing the "bridging" operation. It will be noted that in this configuration the return flow of hydraulic fluid to the reservoir is limited by the calibrated orifice (64).

In the final analysis, in the embodiment in FIG. 4, actuation of the "bridging" operation is obtained by means of the same combination of the moving slide (58) and the restrictor (64). However, in this embodiment, the converter construction is simpler, and it is possible to do without the outlet line (74) in the embodiment in FIG. 3 and also without the sealing bush (73a) since the annular spaces (67 and 73) here both join up with the single outlet line (86).

The electrovalves (76 and 82) are preferably controlled, as described with reference to FIGS. 1 and 2, by means of an electronic device receiving signals corresponding respectively to the rotational speed of the input shaft (12) and of the output shaft (11) in such a manner as to actuate "bridging" as soon as the ratio of these speeds reaches a pre-determined value corresponding to the theoretical coupling of the converter. As in the first embodiment a timing circuit is preferably provided which receives signals corresponding to the gear ratio changes in such a manner as to interrupt "bridging" on each gear change during the duration of the change.

We claim:

1. A transmission device comprising: input and output means, a housing drivingly connected to said input means and defining a main chamber, a hydrodynamic torque converter means disposed within said main chamber and having an impeller member drivingly connected to said housing, a turbine member located within said main chamber, and means defining a clutch assembly drivingly connected for rotation with said turbine member and capable of frictionally engaging said input means, said clutch assembly having walls defining a clutch disengagement chamber in said housing and including a piston movable in response to differential pressure between said disengagement chamber and said main chamber; means defining a hydraulic circuit including a pressure control valve means for providing a substantially constant pressure unidirectional fluid source; and control means operable in response to a pressure change in one of said chambers for producing an opposite pressure change in the other said chamber.

2. The transmission of claim 1 wherein said clutch assembly has a clamping portion provided with a friction lining, said friction lining being operable as a seal between the disengagement chamber and the main chamber.

3. The transmission of claim 1 having a throughflow orifice leading to the disengagement chamber, said control means including a slide which is movable between a position where it covers the throughflow orifice and a position where it uncovers the throughflow orifice, said slide having an upstream face which is exposed to the constant pressure fluid from the pressure control valve, said slide having a downstream face which is exposed to the pressure in the main chamber, and a return spring biasing the slide toward the position where it covers the throughflow orifice.

4. The transmission of claim 1 wherein the control means is a valve which is operable to introduce said pressurized fluid into the disengagement chamber when the pressure from the pressure control valve is greater than the pressure in said main chamber.

5. The transmission of claim 1 wherein said control means is operable in response to a pressure increase in said main chamber to interrupt the supply of fluid to said disengagement chamber.

6. The transmission of claim 1 wherein said control means is operable in response to a pressure decrease in the disengagement chamber to introduce fluid from said fluid source directly into the main chamber.

7. The transmission of claim 1 wherein said control means includes a control valve which is movable between a first position and a second position where it respectively obstructs and permits the flow of fluid from said fluid source to a first said chamber, said valve means being movable in response to changes in the pressure differential between the fluid source and a second said chamber.

8. The transmission of claim 1 including means for producing a pressure drop in said main chamber, said means for producing a pressure drop including an electrohydraulic transducer in communication with said main chamber, and a restricter mounted in parallel with said transducer, whereby the opening of said transducer produces a pressure drop in said main chamber.

9. The transmission of claim 8 wherein said transducer is movable from an open position to a closed position in response to a control signal supplied thereto.

10. In a transmission, an input member and an output member, drive means including a fluid drive connecting said members, said fluid drive having rotatable bladed elements located in a fluid chamber, a clutch connecting said members, a unidirectional hydraulic fluid supply means for providing a source of constant pressure fluid; clutch control means comprising
 a first chamber fed by constant pressure fluid from said fluid supply means,
 a first passage hydraulically connecting said first chamber with said fluid chamber,
 a second chamber having a movable element which is operatively connected to said clutch,
 a second passage hydraulically connecting said first chamber with said second chamber,
 valve means for opening and closing said second passage in response to changes in the differential pressure between said fluid chamber and said constant pressure fluid from the fluid supply means.

11. The transmission of claim 10 wherein said hydraulic fluid supply means is connected to the first chamber by an axial passage, said transmission having a return passage leading from said fluid chamber, and a valve for controlling the return flow of fluid in said return passage.

12. The transmission of claim 10 wherein said clutch has a clamping portion provided with a friction lining, said friction lining being operable as a seal for said second chamber.

13. The transmission of claim 10 wherein said valve means is a slide which has an upstream face exposed to the constant output pressure of said fluid supply means, said slide having a downstream face which is exposed to the pressure in said fluid chamber, and a return spring engaged with the downstream face of said slide.

14. The transmission of claim 10 wherein said valve means is operable to open said second passage when the pressure of the supply means is greater than the pressure in said fluid chamber.

15. In a transmission, an input member and an output member, drive means including a fluid drive connecting said members and having rotatable bladed elements located in a fluid chamber, and a clutch connecting said members; a constant pressure unidirectional hydraulic fluid supply means; clutch control means comprising a first chamber fed by said constant pressure fluid from the supply means;

a second chamber having a movable element which is operatively connected to said clutch, a first passage communicating said first chamber with said second chamber, a second passage communicating said first chamber with said fluid chamber, a return passage for the hydraulic fluid from said second chamber, and return valve means for opening and closing said return passage, means for providing within said second chamber an intermediate fluid pressure smaller than said supply pressure, control valve means for opening and closing said second passage in response to changes in the differential pressure between said second chamber and said constant pressure fluid from the supply chamber.

16. The transmission of claim 15 having a drain passage leading from said fluid chamber to said return valve means, said return valve means being operable in one position to close said return passage and being operable in another position to close said drain passage.

17. The transmission of claim 15 wherein said control valve means is operable to open when the constant pressure from the supply means is greater than the pressure in the second chamber.

18. The transmission of claim 15 wherein the control valve means is a slide which is capable of covering and uncovering the second passage, said slide having an upstream face in communication with the first chamber and a downstream face in communication with the second chamber, and a compression return spring acting on the downstream face of said slide.

19. The transmission of claim 15 having a central transmission shaft with a converter hub at the end thereof, said central transmission shaft having a passage for carrying hydraulic fluid to the first chamber, said control valve being located in the converter hub.

20. The transmission of claim 15 wherein said return valve means is a three-way electrovalve which is movable from a first position to a second position, said electrovalve when in said first position being operable to prevent a return flow of fluid from said fluid chamber, said electrovalve when in said second position being operable to prevent a return flow of fluid from said second chamber.

21. The transmission of claim 20 including a restrictor located in the flow path between the electrovalve and the fluid chamber.

22. The transmission of claim 15 wherein the return valve means is an electrically actuated blocking check valve, said return passage being connected to the check valve, and a secondary return line connected to the return passage, said secondary return line having a restrictor 88 therein.

23. The transmission of claim 15 including electronic control means for receiving signals which correspond to the rotational speeds of the input member and the output member, and an electrohydraulic transducer which is operable to change the pressure in one of said chambers when the ratio of these speeds reaches a preset value.

24. The transmission of claim 23 wherein the electronic control means includes interruptor means for interrupting the operation of said clutch during gear ratio changes, said interruptor means including a time delay circuit for receiving signals corresponding to gear ratio changes.

* * * * *